July 12, 1960 E. I. SOULE 2,944,369
SAP COLLECTION APPARATUS AND METHOD
Filed Aug. 6, 1958
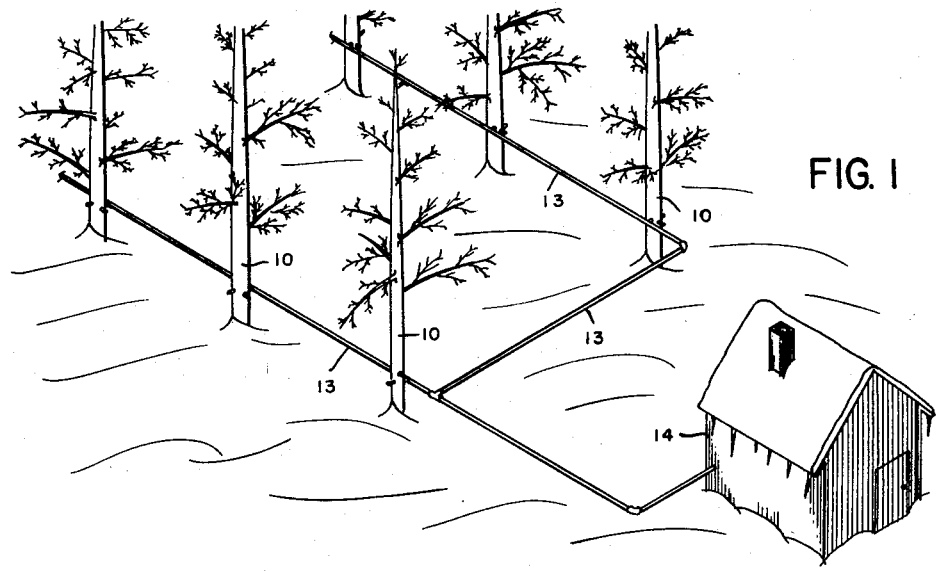
FIG. 1
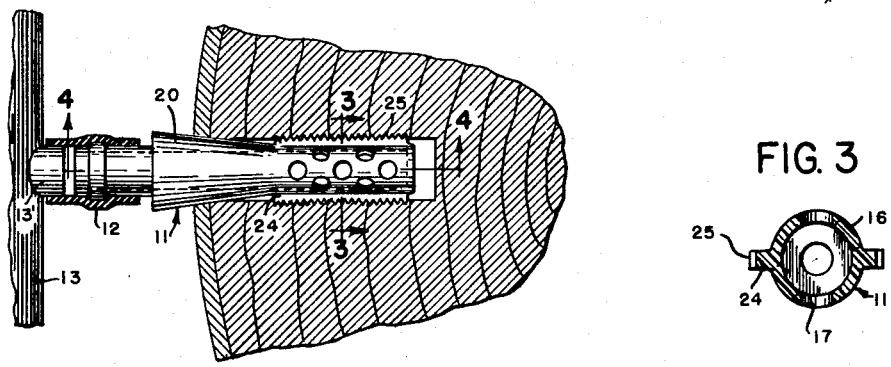
FIG. 2
FIG. 3
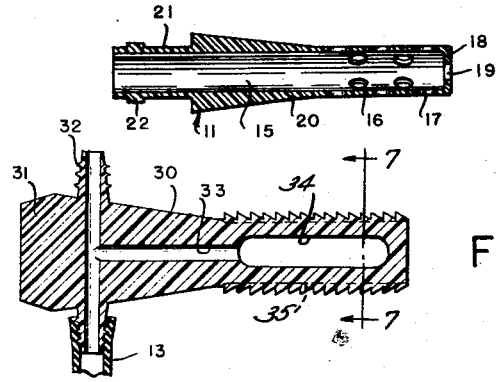
FIG. 4
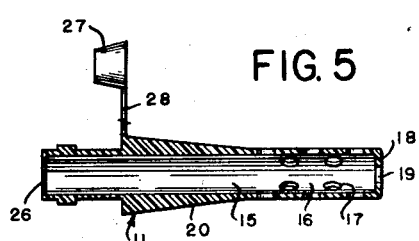
FIG. 5
FIG. 7
FIG. 6
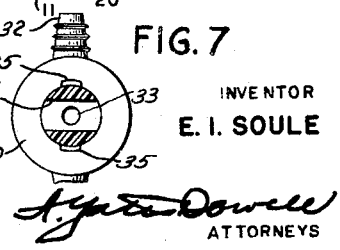
INVENTOR
E. I. SOULE
BY
ATTORNEYS

United States Patent Office 2,944,369
Patented July 12, 1960

---

2,944,369

SAP COLLECTION APPARATUS AND METHOD

Everett I. Soule, St. Albans, Vt.

Filed Aug. 6, 1958, Ser. No. 753,477

3 Claims. (Cl. 47—52)

This invention relates to the collection of fluent materials of various kinds including those found in nature in various forms such as sap from trees and employed in various ways including for food, and to apparatus or equipment employed in the collection of such sap and in the treatment of said sap after it has been collected.

The invention relates particularly to said collection apparatus or equipment and method for the collection of sap from sugar maple and other trees where it is essential to maintain sanitary conditions and to exclude bacteria to avoid contamination and injury reducing the area of the tree which could be tapped as well as the amount of first quality sap which can be obtained therefrom.

This application is a continuation-in-part of copending application Serial No. 676,335, filed August 5, 1957.

It has been customary in the collection of sap in the maple sugar industry to provide a hole in the trunk of the tree and insert a spout through which the sap could escape and be collected. Ordinarily these spouts have been removed at the end of the season and new holes made at the beginning of the next season. This has left exposed openings for the admission of air and water and has promoted the growth of bacteria in the tree causing contamination of the surrounding wood for a couple of inches in every direction so that another tap hole could not be made in the infected area without discloration and contamination of the sap. Also, it has been necessary to ream or retap holes to promote flow of sap stopped by the growth of bacteria in the tap hole. Sap spouts heretofore in use have shut off part of the sap wood and prevented or restricted the flow of sap through some of the veins of the tree.

It is an object of the invention to overcome the difficulties enumerated and to provide sap collection apparatus and method including a sap spout constructed so that it will not shut off part of the sap wood, will offer no resistance to the flow of sap in a manner to increase the yield, and will be maintained air and water tight during and between seasons. The proposed method will eliminate or substantially reduce the contaminated area so that a greater part of the tree surface about its circumference will be available for subsequent tapping and consequently greater yield.

Another object of the invention is to provide a sap collection apparatus and method which is labor saving, develops greater pressure to make it possible to cause the sap to flow more positively and possibly uphill although at any event sufficiently to enable the sap to be conducted directly to a conveniently located sap evaporating house or storage tank.

Another object of the invention is to provide sap collection apparatus and method rendering it possible to tap trees at any convenient time including before the start of the flow of sap on account of the sealed sap spouts as well as a system in which the collection of sap is increased during the season up to 100%.

A further object of the invention is to provide a sap spout of plastic or other substance capable of being molded or otherwise inexpensibly produced in which its protruding end is kept closed until connected to a collection line at which time the closure may be removed by a sharp instrument or other tool and at the same time a small amount of disinfectant may be injected into the sap spout and the hole of the tree in which it is placed to insure absolute sterility and with a plug integral with, attached, to or separate from the sap spout which can be inserted in the spout to reseal the same at the end of the season. The spout may be permanently closed with a heat sealing device.

A further object of the invention is to provide a sap spout so constructed that by reason of growth of the tree which may average nearly ½″ per year and which growth has a tendency to force the spout from the tree that such growth will be utilized to more firmly grip the sap spout due to its having on its exterior a pair of opposed longitudinal ribs each provided with tooth forming serrations which will be gripped by the tree and the pressure of the tree tending to eject the sap spout overcome.

A yet further object of the invention is to provide a sap spout of a pliable plastic or other material instead of a rigid substance so that it may be easily inserted in the tap hole instead of having to be inserted by forceful means such as being struck with a mallet or a hammer as well as a sap spout and tubing produced in different colors to enable different lines to be distinguished in the manner common in the hookup of electric wires in telephone systems and the like.

A still further object of the invention is to provide a tapered plug having a solid large end and hollowed or with an internal bore for a portion of its length rearwardly thereof, laterally disposed frangible nipples in communication with the hollow interior of the plug, the end of the plug adjacent the nipples being solid or imperforate so that after the sap season the plug may be driven further into the tree to shear off the frangible nipples and close and seal the hole.

Other objects and advantages of the invention will be apparent from the following description taken in conjunction with the accompanying drawing wherein:

Fig. 1 is a perspective illustrating one application of the invention;

Fig. 2, an enlarged fragmentary detail with the sap spout in elevation;

Fig. 3, a transverse section through the sap spout on the line 3—3 of Fig. 2;

Fig. 4, a longitudinal section of the sap spout on the line 4—4 of Fig. 2;

Fig. 5, a similar view of the sap spout before its end is opened for use;

Fig. 6, a modified form of a sap spout; and

Fig. 7, a transverse vertical section taken substantially on the line 7—7 of Fig. 6, showing the transverse inlet aperture.

Briefly stated the collection of sap from maple trees is accomplished by a series of sap spouts connected to a pipe line which leads to a storage tank or to sap evaporating house for processing into standard syrup. In order to insert the sap spout a hole is drilled into the tree and the sap spout is inserted, the spout being formed of a hollow sleeve with the outer end portion externally tapered to form a plug to fill the hole and with the outer end of the sap spout closed by a thin end wall easily removable when the sap spout is connected to a pipe line. Each spout has a pair of oppositely disposed longitudinal ribs with tooth forming serrations, such ribs being adapted to be disposed in horizontal positon. The sap spout also may be provided with an integral plug and/or sealing device for permanently closing said sap spout to exclude air, water and bacteria.

A modified form of sap spout may be employed composed of a plug having an enlarged closed or solid driving end and with one or more frangible hollow projections or nipples for receiving tubing thereon. The plug has an axial or longitudinal bore through which the sap flows from the tree and the plug tapers from adjacent its larger driven end portion to its reduced smaller intermediate portion. The remainder of the plug is of substantially uniform etxernal diameter and with a transverse axially disposed slot therethrough instead of a series of spaced openings as in the preceding figures. The small exterior portion of the plug may have oppositely located axially disposed serrated ribs about which the wood of the tree may grow and secure the spout in the trunk of a tree. At the end of the sap season the spout may be driven into the tree causing the prongs or projections to be broken and the hole to be plugged and sealed.

With continued reference to the drawing, in accordance with the present invention a number of trees 10 are adapted to be relieved of sap by having inserted therein a sap spout 11, the sap being conveyed through a flexible connection 12 and a pipeline 13 to a conveniently located storage tank or sap evaporating house 14 where the sap can be condensed in any suitable manner as by evaporation.

Ordinarily the sap spouts are removed at the end of the season leaving a hole in the tree in which undesirable bacteria contaminate the area within and about the hole left by the removal of the sap spout, such contaminated area reduces the area in which a sap spout may be subsequently placed, and sometimes results in serious injury to the tree thus reducing its life span.

The sap spout of the present invention includes a sleeve 15 relatively smooth and uniform in size on its interior, the end portion 16 adapted to be inserted in a tree having a wall of substantially uniform thickness with openings 17 and an end wall 18 with an opening 19 similar to the opening 17, all of such openings are adapted to allow sap to enter the sleeve.

The other end of the sleeve 15 has an externally tapered portion 20 which gradually increases in diameter from midway to near the opposite end of the sleeve forming a plug for closing an opening in which the sleeve is inserted. The rear end of the sleeve is likewise provided with a reduced nipple or extrusion 21 having an enlarged collar-forming portion 22 for reception thereon of one end of a flexible hose 12 the other end of which is adapted to be connected to a nipple 13' of the pipe system 13.

The sap spout is provided with a pair of diametrically opposed longitudinally disposed ribs 24 having tooth-forming serrations 25 which are engaged by the wood of the tree and thus grip the spout to retain it in place during the growth of the tree and overcome the tendency of the spout to be driven from the opening in which it is located. The spout is inserted into the tree and the openings 17 and 19 allow the sap to enter the sleeve and pass through the pipelines to the collection station 14. When the spout is inserted into the tree the ribs 24 are disposed in horizontal position. This prevents interference with the sap entering the sleeve through the openings in the wall. When the sap spout is inserted its outer end is provided with a closure 26 which is removed before the flexible hose section 12 is applied in order that sap may flow from the spout. At the end of the season instead of removing the spout it is left in the tree and the end of the spout is closed by a plug 27 which may be integral with and connected to the enlarged tapered portion 20 of the sleeve by means of a connecting strip 28 or otherwise closed by means of a heat sealing device.

The sap spout just described may be further simplified by providing a tapered plug 30 having a solid driven end 31 and one or more nipples 32 adjacent thereto for the reception of the tubing 13 forming a part of the collection system. The nipples or sleeves 32 are frangible so that they may be detached by driving the plug into the tree and the interior of the nipples communicate with a central axial bore of the plug through which the sap is adapted to flow from the tree. The inner end of the sap spout is provided with serrated ribs 35 extending outwardly from the small diameter end of the intermediate conically tapered portion to the inner end of the sap spout and a transverse inlet passage 34 for sap is provided in the same portion of the sap spout with such passage 34 being a slot extending completely through the inner portion of the sap spout. The plug tapers from adjacent its larger driven end to a smaller intermediate portion from which the remainder of the plug is of substantially uniform external diameter, the tapered portion being adapted to fill the opening in the tree through which the smaller portion of the plug is inserted.

At the end of the sap season the spout may be driven into the tree causing the prongs or projecting nipples 32 to be sheared off and the hole to be filled and tightly sealed.

The sap spout just described is relatively simple and eliminates the opening in the plug in the end of the same as well as the reduced end for the application of the tubing and the hole in the tree can be stopped by a single blow from a hammer.

In the collection of sap the hydraulics of the maple tree must be taken into consideration. It has been found that an outward pressure on a good sap day can run upwards of 20 pounds per square inch and as the sap stops flowing the pressure is limited and reaches a suction pressure of up to ten pounds per square inch so that the belief that a pool of sap running in the tap hole prevents the entrance of air is false as suction within the tap hole removes the sap from such hole and as a practical matter there are many hours of the day when a tap hole is exposed to the air, thus permitting the entrance of bacteria as well as the drying of the tap hole.

It will be apparent from the foregoing that sap collection apparatus and method are provided of simple and inexpensive character requiring minimum labor to apply and use, which maintains the most desirable sanitary conditions excluding air, water and harmful bacteria which spoil areas around tapped holes in the trees, reduce the areas of the tree which could be tapped and the amount of sap collected, the effect of which results in maximum yield and collection of sap. The sap spout of the present invention will be held in the tree securely due to its having longitudinal ribs on its exterior with teeth to be tightly gripped by the tree and forms a part of a system in which the collection of sap is materially simplified and improved.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A sap collector spout for secure attachment to a tree in a bore in the tree, said spout providing for continuous flow of the sap regardless of the depth of insertion of the spout into the bore of the tree, said spout comprising an elongated body having an axial passage through at least a major portion of the spout, an intermediate portion of said spout having a conical taper with the large diameter of the intermediate conically tapered portion always being exteriorly of the tree and the maximum diameter of the intermediate conically tapered portion being substantially greater than the diameter of the bore in the tree into which the spout is inserted whereby a wedging action will at all times be maintained between the intermediate conically tapered portion of the spout and the entrance end of the bore of the tree to assure a fluid tight connection, rib means having serrated outer edges extending from the small diameter end of the intermediate conically tapered portion to the inner end of the spout, the distance from the outer edges of the rib means and the teeth formed by the serrations on the rib means being less than the large diameter of the intermediate conically tapered portion and such distance being sufficiently large to grip the bore in the tree additionally retaining the spout in the bore, the portion of said spout adjacent said rib means lying within a space defined by a cylinder having a diameter not greater than the diameter of the bore in the tree, said passage through at least a major portion of the spout extending in the conical intermediate portion beyond a section of the conical portion having a diameter greater than the outer diameter of the bore in the tree, said spout having transverse inlet opening means in communication with the longitudinal passage throughout a substantal portion of the length of the spout and lying in the portion of the spout between the small diameter end of the intermediate conically tapered portion and the inner end of the spout whereby regardless of how far the spout is inserted into the bore or even though the inner end of the spout engages the bottom of the bore, sap may run into the transverse opening means and into the longitudinal passage to provide for continuous uninterrupted flow of sap through the spout, additional passage means being provided between the longitudinally extending passage extending a major portion of the length of the spout to an edge of the spout beyond the section of said intermediate conically tapered portion of greater diameter than the tree bore to provide for collection of sap through said additional passage means.

2. The invention according to claim 1 in which the sap collector spout is provided with a nipple extending outwardly from the large diameter end of the intermediate conicaly tapered portion and has a passage in communication with said additional passage means and said nipple is provided with an enlarged collar forming portion spaced from the outer end of said nipple for providing attachment of a flexible pipe connection.

3. The invention according to claim 1 in which at least one nipple extends transversely from said intermediate conically tapered portion and at a location outwardly beyond a section of said intermediate conically shaped portion of greater diameter than the tree bore, said nipple providing communication from said additional passage means to the extremity of the nipple whereby a pipe may be connected to said nipple and after completion of the sap collection the sap spout can be driven into the bore of the tree, shearing off the nipple from said intermediate conically shaped portion and permanently sealing the bore from the exterior.

References Cited in the file of this patent

UNITED STATES PATENTS

| | | |
|---|---|---|
| 45,996 | Hays | Jan. 24, 1865 |
| 306,527 | Rueter | Oct. 14, 1884 |
| 506,386 | Wood | Oct. 10, 1893 |
| 542,795 | Cary | July 16, 1895 |
| 764,324 | Warner | July 5, 1904 |
| 1,186,741 | Brower | June 13, 1916 |
| 1,221,509 | Chesley | Apr. 3, 1917 |
| 2,727,547 | Moon | Dec. 20, 1955 |
| 2,867,807 | Austett | Jan. 13, 1959 |
| 2,877,601 | Griggs | Mar. 17, 1959 |

FOREIGN PATENTS

| | | |
|---|---|---|
| 489,913 | Canada | Jan. 27, 1953 |
| 1,098,634 | France | Mar. 9, 1955 |
| 457,083 | Great Britain | Nov. 20, 1936 |
| 733,440 | Great Britain | July 13, 1955 |

OTHER REFERENCES

Publication: "A Report on Experiments Using Plastic Tubing to Gather Maple Tree Sap," George B. Breen, July 1, 1957, Minnesota Mining and Manufacturing Company, Irvington Division, Irvington 11, N.J.